3,049,540
16α,17α-CYCLIC ESTERS OF STEROIDS OF
THE PREGNENE SERIES
Josef Fried, Princeton, N.J., assignor to Olin Mathieson
Chemical Corporation, New York, N.Y., a corporation
of Virginia
No Drawing. Filed May 2, 1960, Ser. No. 25,866
18 Claims. (Cl. 260—239.55)

This invention relates to, and has for its object, the provision of a method for preparing physiologically active steroids and to the physiologically active stroids produced thereby.

The steroids of this invention include the 16α,17α-cyclosulfite and 16α,17α-cyclosulfate esters of 16α,17α-dihydroxy steroids of the pregnene series unsubstituted in the C-ring, which series includes, inter alia, compounds having either a pregnene, a pregnadiene, or a pregnatriene nucleus. More particularly, this invention includes 16α,17α-cyclosulfite and 16α,17α cyclosulfate esters of pregnenes represented by the following general formula:

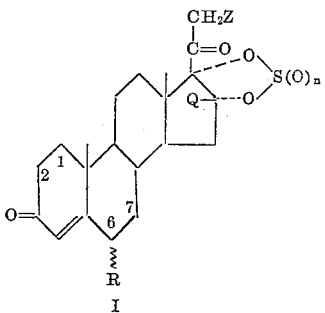

I wherein the 1,2 and/or 6,7 positions are saturated or double bonded; Q is hydrogen or methyl; R is hydrogen, lower alkyl (especially methyl) or halo in either the alpha or beta position; $n$ is one or two; and Z is hydrogen, halogen (especially chloro and fluoro), hydroxy or the acyloxy radical of a hydrocarbon carboxylic acid of less than ten carbon atoms, such as an alkanoic acid especially the lower alkanoic acids (e.g., acetic acid, propionic acid, and hexanoic acid), a monocyclic aromatic carboxylic acid (e.g., benzoic acid, and o,m and p-toluic acids), a monocyclic lower aralkanoic acid (e.g., phenylacetic acid and β-phenylpropionic acid), a lower alkenoic acid, a lower cycloalkanoic acid, or a lower cycloalkenoic acid.

Among the compounds of this invention there may be mentioned the 16α,17α-cyclosulfate and 16α,17α-cyclosulfite esters of C-ring unsubstituted 16α,17α-dihydroxyprogesterones, which class of esters includes the following:

(I) The 16α,17α-cyclosulfate and 16α,17α cyclosulfite ester of 6-halogenated 16α,17α-dihydroxyprogesterones, especially the 16α,17α-cyclosulfate and 16α,17α-cyclosulfite esters of 6-fluoro and 6-chloro-16α,17α-dihydroxyprogesterones, such as the 16α,17α-cyclosulfate and 16α,17α-cyclosulfite esters of 6α-fluoro-16α,17α-dihydroxyprogesterone, the 16α,17α-cyclosulfate and 16α,17α-cyclosulfite esters of 6β,21-dichloro-16α,17α-dihydroxyprogesterone, the 16α,17α-cyclosulfate and 16α,17α-cyclosulfite esters of 6β-fluoro-16α,17α-dihydroxy-1-dehydroprogesterone, and the 16α,17α-cyclosulfate and 16α,17α-cyclosulfite esters of 6α-fluoro-16α,17α,21-trihydroxyprogesterone and 21-esters thereof (e.g. the 21-acetate);

(II) The 16α,17α-cyclosulfate and 16α,17α-cyclosulfite esters of 6-lower alkylated-16α,17α-dihydroxyprogesterones, especially the 16α,17α-cyclosulfate and 16α,17α-cyclosulfite esters of 6-methyl(or ethyl)-16α,17α-dihydroxyprogesterones, such as the 16α,17α-cyclosulfate and 16α,17α-cyclosulfite esters of 6α-methyl-16α,17α-dihydroxyprogesterone, the 16α,17α-cyclosulfate, and 16α,17α-cyclosulfite esters of 6β-methyl-16α,17α-dihydroxyprogesterone, the 16α,17α-cyclosulfate and 16α,17α-cyclosulfite esters of 6β-ethyl-16α,17α-dihydroxyprogesterone, the 16α,17α-cyclosulfate and 16α,17α-cyclosulfite esters of 6α-ethyl-16α,17α-dihydroxyprogesterone, the 16α,17α-cyclosulfate and 16α,17α-cyclosulfite esters of 6α-methyl-21-fluoro-16α,17α-dihydroxyprogesterone, the 16α,17α-cyclosulfate and 16α,17α-cyclosulfite esters of 6α-methyl-16α,17α-dihydroxy-1-dehydroprogesterone, and the 16α,17α-cyclosulfate and 16α,17α-cyclosulfite esters of 6α-methyl-16α,17α,21-trihydroxyprogesterone and 21-esters thereof (e.g., the 21-acetate);

(III) The 16α,17α-cyclosulfate and 16α,17α-cyclosulfite esters of 6-dehydro-16α,17α-dihydroxyprogesterones such as the 16α,17α-cyclosulfate and 16α,17α-cyclosulfite esters of 6-dehydro-16α,17α-dihydroxyprogesterone, the 16α,17α-cyclosulfate and 16α,17αcyclosulfite esters of Δ$^{1,4,6}$ - pregnatriene - 16α,17α - diol - 3,20 - dione, the 16α,17α-cyclosulfate and 16α,17α-cyclosulfite esters of 6-dehydro-16α,17α-,21-trihydroxyprogesterone and 21-esters thereof (e.g., the 21-acetate) and the 16α,17α-cyclosulfate and 16α,17α-cyclosulfite esters of 6-dehydro-16β-methyl-16α,17α-dihydroxyprogesterone; and (IV) The 16α,17α-cyclosulfate and 16α,17α-cyclosulfite esters of 6-unsubstituted-16α,17α-dihydroxyprogesterones, such as the 16α,17α-cyclosulfate and 16α,17α-cyclosulfite esters of 16α,17α-dihydroxyprogesterone, the 16α,17α-cyclosulfate and 16α,17α-cyclosulfite esters of 21-fluoro-16α,17α-dihydroxyprogesterone, the 16α,17α-cyclosulfate and 16α,17α-cyclosulfite esters of 16α,17α-dihydroxy-1-dehydroprogesterone, the 16α,17α-cyclosulfate and 16α,17α-cyclosulfite esters of 16α,17α,21-trihydroxyprogesterone and 21-esters thereof (e.g. the 21-acetate), and the 16α,17α-cyclosulfate and 16α,17α-cyclosulfite esters of 16β-methyl-16α,17α-dihydroxyprogesterone.

The compounds of this invention can be prepared by a process of this invention which comprises reacting a streoid of the general formula:

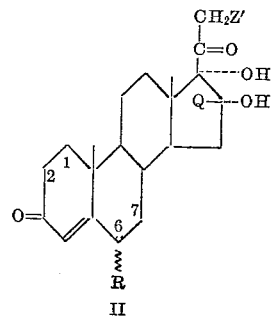

II wherein the 1,2 and/or the 6,7 positions are saturated or double bonded; R and Q are as hereinbefore defined and Z' is hydrogen, halogen (e.g. chloro or fluoro) or an acyloxy radical of a hydrocarbon carboxylic acid of the group hereinbefore defined, with either thionyl chloride or sulfuryl chloride in the presence of an hydrogen chloride acceptor such as an organic nitrogen base (e.g., pyridine, collidine, triethanolamine and quinoline), and recovering the 16,17- cyclic ester thus formed. The reaction is preferably carried out at temperatures below 0° C. by treating a solution or suspension of the steroid in the basic medium with either thionyl chloride or sulfuryl chloride and then recovering the product by conventional procedures.

The steroidal starting materials for preparation of the compounds of this invention are, generally, C-ring unsubstituted derivatives of 16,17-dihydroxyprogesterones.

Among the suitable steroidal starting materials there may be mentioned inter alia:

(I) 6 - halogenated - 16α,17α - dihydroxyprogesterones, especially 6-fluoro and 6-chloro-dihydroxyprogesterones, such as 6α-fluoro-16α,17α-dihydroxyprogesterone, and 21-esters of 6α - fluoro-16α,17α,21-trihydroxyprogesterone (e.g. the 21-acetate);

(II) 6-lower alkylated-16α,17α-dihydroxyprogesterones especially 6-methyl (or ethyl)-16α,17α-dihydroxyprogesterones, such as 6α-methyl-16α,17α-dihydroxyprogesterone, 6α - ethyl - 16α,17α - dihydrodihydroxyprogesterone, 6α-methyl-16α,17α-1-dehydrodihydroxy-progesterone, and 21-esters of 6α - methyl-16α,17α,21-trihydroxyprogesterone (e.g., the 21-acetate); and (III) 6 - unsubstituted-16α,17α-dihydroxyprogesterones, such as 16α,17α-dihydroxyprogesterone, 16α,17α-dihydroxy-1-dehydroprogesterone, 21-esters of 16α,17α,21-trihydroxyprogesterone (e.g., the 21-acetate) and 16β-methyl-16α,17α-dihydroxyprogesterone.

Alternatively, the compounds of Formula I wherein $n$ is two may be prepared by the oxidation of the corresponding compound of Formula I wherein $n$ is one with an oxidizing agent such as calcium permanganate.

Where a particular 1-dehydro steroid is desired and only the corresponding 1,2-saturated derivative is available, the latter can be converted to the former by 1,2-dehydrogenation with *Bacterium cyclooxydans* in accordance with the method set out in Example 1 of U.S. Patent No. 2,822,318.

The 6-halo-16α,17α-dihydroxyprogesterones used herein are described in copending application Serial No. 7,521, filed February 9, 1960. The 6-methyl-16α,17α-dihydroxyprogesterone starting materials used herein are described in application Serial No. 830,467, filed July 30, 1959.

The 21-acyloxy-16,17-esters of this invention can be prepared by the alternative process which comprises treating the 16α,17α,21-trihydroxyprogesterone starting material with acetone and perchloric acid followed by treatment with an acid anhydride corresponding to the acyloxy radical desired to yield the 16α,17α-acetonide-21-acylate which is treated with formic acid to hydrolyze the 16,17-ketal group. The 16α,17α,21-trihydroxy-21-acylate derivative is converted to its 16,17-cyclic ester by the hereinbefore described treatment with thionyl or sulfuryl chloride.

The 21-halogenated esters of this invention can alternatively be prepared by treating the corresponding 16α,17α,21-trihydroxyprogesterone with acetone and perchloric acid to yield the corresponding 16,17-acetonide and treating the latter with an organic sulfonyl halide such as mesyl chloride or tosyl chloride to form the 21-sulfonyloxy-16,17-acetonide derivative which is then treated with an alkali metal halide such as lithium chloride, lithium bromide, sodium iodine or potassium bifluoride to yield the corresponding 21-chloride, bromide, iodide, or fluoride, respectively. The 21-halo-16,17-acetonides are deacetonated by hydrolysis with an acid (e.g. formic acid) and then treated with thionyl chloride or sulfuryl chloride as hereinbefore described, to yield the desired esters.

The 6-dehydro-16,17-esters of this invention may be prepared by reacting the corresponding 6,7-saturated starting material with a 6,7-dehydrogenating agent (e.g., chloranil in a mixture of ethyl acetate and acetic acid) and separating the 6-dehydro derivative thus formed.

The 16β-methyl-16,17-esters of this invention are prepared by ketalizing a 16-methyl-Δ⁵,¹⁶-pregnadiene-3-ol-20-one with a lower alkylene glycol in the presence of an acid catalyst (e.g. toluenesulfonic acid), treating the resulting 20-ethylene ketal derivative with an oxidizing agent such as aluminum tertiary butoxide in cyclohexanone to form the corresponding Δ⁴-3-one which is then converted to 16β-methyl-16α,-17α-dihydroxyprogesterone 20-ethylene ketal by treatment with osmium tetroxide followed by a reducing agent such as hydrogen sulfite. The dihydroxy compound is converted to its cyclic sulfite or sulfate ester by a two step process involving either hydrolysis of the 20-ketal group with an acid (e.g., sulfuric acid) and then esterification at the 16,17-positions or first esterification at the 16,17-positions and then hydrolysis of the ketal radical with an acid (e.g., perchloric acid).

The 6β-methyl and 6β-halo-cyclic esters of this invention are prepared by treating a 6β-methylpregnane-5α,16α,17α-triol-3,20-dione (prepared as disclosed in my copending application Serial No. 830,467, filed July 30, 1959) or the corresponding 6β-halo-triol (described in the same application) with either thionyl chloride or sulfuryl chloride in an organic base as hereinbefore disclosed to simultaneously esterify the 16,17-position and dehydrate the 4,5α-position thereby yielding 6β-methyl-16α,17α-dihydroxyprogesterone-16α,17α-cyclic ester or the 6β - halo-16α,17α-dihydroxyprogesterone 16α,17α-cyclic ester, respectively.

If a 21-acyloxy steroid is employed as the starting material and the corresponding 21-hydroxy steroid is desired as the final product, the 21-acyloxy-16α,17α-dihydroxyprogesterone 16α,17α-cyclic ester product is hydrolyzed as by treatment with an alkali metal carbonate (e.g. potassium carbonate) to yield the desired free 21-hydroxy final product. Alternatively, the 21-acyloxy products of this invention may be converted to the corresponding 11β-hydroxy-21-acyloxy-derivatives by known methods such as by subjecting the 21-acyloxy-11-desoxy-starting material to microbiological oxidation by the enzymes of *Cunninghamella blakesleeana* as disclosed in Steroids, Fieser, p. 673 (1959).

The compounds of this invention as represented by Formula I are physiologically active substances which possess progestational and anti-uterotrophic activity and hence can be used in lieu of known progestational agents, such as progesterone, in the treatment of diseases and conditions such as habitual or threatened abortion, amenorrhea, metropathic hemorrhagica, dysmenorrhea, inadequate corpus luteum function and premenstrual tension, being formulated for such administration in the usual perorally or parenterally acceptable formulations.

The following examples illustrate, without limiting this invention (all temperatures being in degrees centigrade):

EXAMPLE 1

*16α,17α-Dihydroxyprogesterone 16α,17α-Sulfite*

To a solution of 1.5 g. of 16α,17α-dihydroxyprogesterone in 20 ml. of anhydrous pyridine is added at −15° with stirring 3 ml. of pure thionyl chloride. The reaction is allowed to proceed at −15° for 3 minutes, after which time ice water is added slowly causing crystallization of the resulting sulfite ester. The crystals are filtered, washed thoroughly with water and dried in vacuo. The dried product melts at about 268–273° and weighs about 1.45 g. To obtain analytically pure material the above product is dissolved in 12 ml. of chloroform and 4 ml. of benzene and chromatographed on 30 g. of Woelm neutral alumina. Elution of the column with 400 ml. of a mixture of three parts of chloroform and one part of benzene gives material, which upon one crystallization from acetone, furnishes analytically pure 16α,17α-dihydroxyprogesterone 16α,17α-sulfite having the following properties: M.P. about 278–279°; $[\alpha]_D^{23}+182°$ (c., 1.15 in chlf.);

$\lambda_{max.}^{alc.}$ 239 mμ ($\epsilon$=16,200); $\lambda_{max.}^{Nujol}$ 5.81, 5.98, 6.20 and 8.29 (S=O) μ

*Analysis.*—Calc'd for $C_{21}H_{28}O_5S$ (392.48): C, 64.27; H, 7.19; S, 8.17. Found: C, 64.26; H, 7.07; S, 8.23.

16α,17α-dihydroxyprogesterone 16α,17α-sulfite possesses twice the activity of progesterone in the parenteral Clauberg assay.

EXAMPLE 2

*16α,17α-Dihydroxy-1-Dehydroprogesterone 16α,17α-Sulfite*

To a solution of 1.5 g. of 16α,17α-dihydroxy-1-dehydroprogesterone (prepared by dehydrogenating 16α,17α-dihydroxyprogesterone with *Bacterium cyclooxydans* in accordance with Example 1 of U.S. Patent 2,822,318) in 20 ml. of anhydrous pyridine is added at −15° with stirring 3 ml. of pure thionyl chloride. After three minutes ice water is added slowly causing precipitation of the resulting sulfite ester. The crystals are filtered, washed, dried in vacuo, and then chromatographed over neutral alumina using chloroform-benzene (3:1) as the eluant to yield the product 16α,17α-dihydroxy-1-dehydroprogesterone 16α,17α-sulfite.

EXAMPLE 3

*16α,17α,21-Trihydroxyprogesterone 16,17-Sulfite-21-Acetate*

Following the procedure of Example 1, 16α,17α,21-trihydroxyprogesterone 21-acetate (prepared by treating 100 mg. of 16α-hydroxycortexolone with acetone and 0.01 ml. of 70% perchloric acid to yield the 16,17-acetonide derivative of 16α-hydroxycortexolone which is first transformed to its 21-acetate by treatment with pyridine and acetic anhydride and then to the desired 16α-hydroxycortexolone 21-acetate by hydrolysis of the 16,17-ketal group with 60% aqueous formic acid) is treated with thionyl chloride to yield a crystalline product which is separated from the reaction mixture and then chromatographed on neutral alumina using chloroform-benzene as the eluant to yield the product 16α,17α,21-trihydroxyprogesterone 16α,17α-sulfite 21-acetate.

EXAMPLE 4

*16β-Methyl-16α,17α-Dihydroxyprogesterone 16α,17α-Sulfite*

(A) *Preparation of Δ$^{5,16}$-16-methylpregnadiene-3β-ol-20-one-20-ethylene ketal.*—A mixture of 3 g. of Δ$^{5,16}$-16-methylpregnadiene-3β-ol-20-one, 9 ml. of ethylene glycol and 112 ml. of benzene is heated at reflux with stirring with the aid of a Dean-Stark separator. When 20 ml. of benzene has distilled, 186 mg. of toluenesulfonic acid monohydrate is added to the mixture and the reaction is allowed to proceed with stirring for 16 hours at reflux temperature. After cooling, the mixture is neutralized by the addition of sodium bicarbonate solution followed by the addition of water. The layers are separated, the benzene extract washed with water, dried over sodium sulfate and evaporated to dryness in vacuo. The crystalline residue after recrystallization from acetone furnishes the pure ketal of the following properties: M.P. about 168–169°; [α]$_D^{23}$ −82° (c., 1.25 inchlf.).

*Analysis.*—Calc'd for $C_{24}H_{36}O_3$ (372.53): C, 77.34; H, 9.74. Found: C, 77.22; H, 9.40.

(B) *Preparation of Δ$^{4,16}$-16-methylpregnadiene-3,20-dione-20-ethylene ketals.*—A solution of 2.5 g. of Δ$^{5,16}$-16-methylpregnadiene-3β-ol-20-one 20-ethylene ketal in a mixture of 90 ml. of xylene and 30 ml. of freshly distilled cyclohexanone is distilled until 5 ml. of distillate have been collected. To this solution is added 2.5 g. of aluminum tertiary butoxide and the resulting solution is refluxed for 50 minutes. Water is added and after separation of the layers the aqueous phase is extracted thoroughly with chloroform. The combined xylene and chloroform extracts are dried over sodium sulfate and the solvents and the cyclohexanone removed in high vacuum. The remaining residue is taken up in hexane and chilled, upon which crystallization occurs. Yield: about 1.69 g. The analytically pure material obtained after recrystallization from acetone, exhibits the following properties: M.P. about 175–177°; [α]$_D^{23}$ +61° (c. 1.1 in chlf.);

$\lambda_{max.}^{alc.}$ 240 mμ (ε=15,700); $\lambda_{max.}^{Nujol}$ 5.99, 6.12 and 6.21μ

*Analysis.*—Calc'd for $C_{24}H_{34}O_3$ (370.51): C, 77.80; H, 9.25. Found: C, 77.76; H, 9.38.

(C) *Preparation of 16β-methyl-16α,17α-dihydroxyprogesterone 20-ethylene ketal.*—To a solution of 555 mg. of Δ$^{4,16}$-16-methylpregnadiene-3,20-dione 20-ethylene ketal in 45 ml. of benzene and 2.25 ml. of pyridine is added 438 mg. of osmium tetroxide. The vessel containing the reaction mixture is stored in total darkness at room temperature for 21 hours. 90 ml. of dioxane is then added and the resulting solution saturated with hydrogen sulfide for 7 minutes. The osmium precipitate is centrifuged off and the clear solution added to chloroform and water. The organic layer is washed several times with water, dried over sodium sulfate and evaporated to dryness in vacuo. There remains a crystalline residue which after recrystallization from acetone-hexane furnishes pure 16-methyl-16α,17α-dihydroxyprogesterone 20-ethylene ketal of the following properties: M.P. about 186–187° and about 172–174° (polymorphic modificaions); [α]$_D^{23}$ +74° (c., 1.38 in chlf.); +54° (c., 1.24 in methanol);

$\lambda_{max.}^{alc.}$ 240 mμ (ε=16,100); $\lambda_{max.}^{Nujol}$ 2.99, 6.03 and 6.23μ

*Analysis.*—Calc'd for $C_{24}H_{36}O_5$ (404.53): C, 71.25; H, 8.97. Found: C, 70.88; H, 9.19.

(D) *Preparation of 16β-methyl-16α,17α-dihydroxyprogesterone 16α,17α-sulfite 20-ethylene ketal.*—To a solution of 200 mg. of 16β-methyl-16α,17α-dihydroxyprogesterone 20-ethylene ketal in 6 ml. of pyridine is added at −15° with stirring 0.2 ml. of thionyl chloride and the reaction is allowed to proceed at that temperature for 3 minutes. Ice water is then added and the resulting crystals removed by filtration and washed well with water. Recrystallization of this material (about 215 mg.) from chloroform-ethanol furnishes about 170 mg. of pure 16β-methyl-16α,17α-dihydroxyprogesterone 16α,17α-sulfite 20-ethylene ketal of the following properties: M.P. about 225–226°; [α]$_D^{23}$ +81° (c., 1.03 in chlf.);

$\lambda_{max.}^{alc.}$ 240 mμ (ε=16,400); $\lambda_{max.}^{Nujol}$ 6.01, 6.21 and 8.22μ

*Analysis.*—Calc'd for $C_{24}H_{34}O_6S$ (450.57): C, 63.94; H, 7.60. Found: C, 63.85; H, 7.88.

(E) *Preparation of 16β-methyl-16α,17α-dihydroxyprogesterone 16α,17α-sulfite.*—To a solution of 100 mg. of 16β-methyl-16α,17α-dihydroxyprogesterone 16α,17α-sulfite 20-ethylene ketal in 12 ml. of methanol is added 1.04 ml. of 70% perchloric acid and the mixture is stirred at room temperature for 16 hours. Water is added and the solution is neutralized with sodium bicarbonate. The bulk of the methanol is removed in vacuo and the resulting suspension extracted with chloroform. The chloroform extract is washed with water, dried over sodium sulfate and evaporated to dryness in vacuo. The residue after crystallization from methanol yields 16β-methyl-16α,17α-dihydroxyprogesterone 16α,17α-sulfite of the following properties: M.P. about 178–179° and about 196–203° (polymorphic modifications); [α]$_D^{23}$ +126° (c., .82 in chlf.);

$\lambda_{max.}^{alc.}$ 239 mμ; (ε=16,400); $\lambda_{max.}^{Nujol}$ 5.83, 5.96, 6.20, and 8.20–8.30μ

*Analysis.*—Calc'd for $C_{22}H_{30}O_5S$ (406.46): C, 64.99; H, 7.43; S, 7.90. Found: C, 64.38; H, 7.78; S, 7.85.

(F) *Alternative preparation of 16β-methyl-16α,17α-dihydroxyprogesterone 16α,17α-sulfite.*—A solution of 78 mg. of 16β-methyl-16α,17α-dihydroxyprogesterone 20-ethylene ketal in 23 ml. of methanol and .78 ml. of 8% sulfuric acid is heated under reflux for 45 minutes. The mixture is cooled, neutralized with dilute sodium bicarbonate and after removal of the bulk of the methanol in vacuo extracted with chloroform. The chloroform extract is washed with water, dried over sodium sulfate and evaporated to dryness in vacuo. The residual material after recrystallization from acetone-hexane furnishes pure 16β-methyl-16α,17α-dihydroxyprogesterone of the following properties: M.P. about 258–261°; [α]$_D^{23}$ +44° (c., .39 in chlf.);

$\lambda_{max.}^{alc.}$ 239 mμ (ε=17,200); $\lambda_{max.}^{Nujol}$ 2.95, 6.05 and 6.21μ

*Analysis.*—Calc'd for $C_{22}H_{32}O_4$ (360.48): C, 73.30; H, 8.95. Found: C, 73.32; H, 8.92.

Reaction of 16β-methyl-16α,17α-dihydroxyprogesterone with thionyl chloride in pyridine at —15° as described in part D furnishes the 16,17-sulfite identical with the product obtained in part E.

EXAMPLE 5

21-Fluoro-16α,17α-Dihydroxyprogesterone 16α,17α-Sulfite

16α,17α,21-trihydroxyprogesterone is treated with acetone and perchloric acid to form 16α,17α,21-trihydroxyprogesterone 16,17-acetonide which is then treated with mesyl chloride under anhydrous conditions at a temperature of 0°. After two hours, water is added and the precipitated 21-mesylate is removed by filtration, washed thoroughly, dried in vacuo and recrystallized from acetone-hexane. The crystalline mesylate is dissolved in ethylene glycol and treated with potassium bifluoride at reflux temperature for forty hours after which the reaction mixture is diluted with water and the crystals filtered off, dried in vacuo and then recrystallized from acetone-hexane to yield the product 21-fluoro-16α,17α-dihydroxyprogesterone 16α,17α-acetonide.

The 16,17-acetonide is deactonated by treatment with 60% formic acid at 100° to yield 21-fluoro-16α,17α-dihydroxyprogesterone which is converted by treatment with thionyl chloride and pyridine to the product 21-fluoro-16α,17α-dihydroxyprogesterone 16α,17α-sulfite.

Similarly, except for the introduction of the methyl group into the corresponding 21-chloro, 21-bromo and 21-iodo derivatives (prepared by treating the 21-mesylate with lithium chloride, lithium bromide and sodium iodide respectively) there are obtained 21-chloro-16α,17α-dihydroxyprogesterone 16α,17α-sulfite, 21-bromo-16α,17α-dihydroxyprogesterone 16α,17α-sulfite and 21-iodo-16α,17α-dihydroxyprogesterones 16α,17α-sulfite, respectively.

EXAMPLE 6

16α,17α-Dihydroxyprogesterone 16α,17α-Sulfate

To a solution of 200 mg. of 16α,17α-dihydroxyprogesterone in 60 ml. of pyridine is added at —15°, 0.2 ml. of redistilled sulfuryl chloride. The reaction is allowed to proceed at —10 to —15° for 15 minutes after which time ice water is added and the mixture is extracted with chloroform. The chloroform extract is washed with 1 N sulfuric acid, water, dilute sodium bicarbonate and again with water, dried over sodium sulfate and the solvent evaporated in vacuo. The crystalline residue, after recrystallization from chloroform-ethanol, furnishes about 150 mg. of pure 16α,17α-dihydroxyprogesterone 16α,17α-sulfate of the following properties: M.P. about 271–273°; $[\alpha]_D^{23}$+155° (c., .99 in chlf.);

$\lambda_{max.}^{alc.}$ 238 mμ ($\epsilon$=14,400); $\lambda_{max}^{Nujol}$ 5.79, 5.99, 6.20, 7.20, 8.29μ

*Analysis.*—Calc'd for $C_{21}H_{28}O_6S$ (408.49): C, 61.75; H, 6.90; S, 7.87. Found: C, 61.74; H, 6.97; S, 7.96.

EXAMPLE 7

16α,17α-Dihydroxyprogesterone 16α,17α-Sulfate

To a solution of 1 g. of 16α,17α-dihydroxyprogesterone 16α,17α-sulfite in 25 ml. of glacial acetic acid is added slowly with stirring and cooling to 10–15°, a filtered solution of 3 g. of calcium permanganate in 6 ml. of water. When the reaction is completed as indicated by the permanent pink color of the solution, the mixture is poured into ice water and extracted with chloroform. The chloroform extract is washed with water, sodium bicarbonate solution, the last washes containing some sodium sulfite to remove excess permanganate, and water, and the chloroform extract dried over sodium sulfate. The solvent is removed in vacuo and the residual 16α,17α-dihydroxyprogesterone 16α,17α-sulfate is recrystallized from chloroform-ethanol.

EXAMPLE 8

16α,17α-Dihydroxy-1-Dehydroprogesterone 16α,17α-Sulfate

To a solution of 200 mg. of 16α,17α-dihydroxy-1-dehydroprogesterone in 60 ml. of pyridine is added at —15°, 0.2 ml. of redistilled sulfuryl chloride. The reaction is allowed to proceed at —10 to —15° for fifteen minutes after which time ice water is added and the mixture is extracted with chloroform. The chloroform extract is washed with 1 N sulfuric acid, water, dilute sodium bicarbonate and again with water, dried over sodium sulfate and the solvent evaporated in vacuo. The crystalline residue after recrystallization from chloroform-ethanol furnishes substantially pure 16α,17α-dihydroxy-1-dehydroprogesterone 16α,17α-sulfate.

EXAMPLE 9

16α,17α,21-Trihydroxyprogesterone 16α,17α-Sulfate 21-Acetate

Following the procedure of Example 7, a solution of 16α,17α,21 - trihydroxyprogesterone 16,17-sulfite 21-acetate in glacial acetic acid is treated with aqueous calcium permanganate. When the reaction is completed as indicated by a permanent pink color, the mixture is poured into ice water and extracted with chloroform. The chloroform extract is washed with water, sodium bicarbonate solutions, the last washes containing some sodium sulfite to remove excess permanganate, and water, and the chloroform extract dried over sodium sulfite. The solvent is removed in vacuo and the residue recrystallized from chloroform-ethanol to yield 16α,17α,21-trihydroxyprogesterone 16α,17α-sulfate 21-acetate.

EXAMPLE 10

16β-Methyl-16α,17α-Dihydroxyprogesterone 16α,17α-Sulfate

Following the procedure of Example 6, redistilled sulfuryl chloride is added to 16β-methyl-16α,17α-dihydroxyprogesterone in pyridine at a temperature of —15°. The reaction is allowed to proceed at —10 to —15° for 15 minutes after which time ice water is added and the mixture is extracted with chloroform. The chloroform extract is washed with 1 N sulfuric acid, water, dilute sodium bicarbonate and again with water, dried over sodium sulfate and the solvent evaporated in vacuo leaving a crystalline residue which is recrystallized from chloroform-ethanol to yield the product 16β-methyl-16α,17α-dihydroxyprogesterone 16α,17α-sulfate.

EXAMPLE 11

6α-Fluoro-16α,17α-Dihydroxyprogesterone 16α,17α-Sulfite

To a solution of 100 mg. of 6α-fluoro-16α,17α-dihydroxyprogesterone in 3 ml. of pyridine is added with stirring at —15° 0.1 ml. of thionyl chloride. The reaction is allowed to proceed at —15° for 3½ minutes, after which ice is added and the mixture taken up in chloroform. After separation of the layers the chloroform extract is washed with dilute sulfuric acid, water, dilute sodium bicarbonate and again with water. Evaporation of the Na₂SO₄-dried chloroform solution in vacuo leaves a crystalline residue, which after recrystallization from chloroform-ethanol furnishes pure 6α-fluoro-16α,-17α-dihydroxyprogesterone sulfite of the following properties: M.P. about 296–298° (dec.); $[\alpha]_D^{23}$+171° (c., 1.0 in chlf.);

$\lambda_{max.}^{alc.}$ 234 mμ ($\epsilon$=12,600); $\lambda_{max}^{Nujol}$ 5.81, 5.95, 6.17 and 8.28μ

*Analysis.*—Calc'd for $C_{21}H_{27}O_5FS$ (410.48): C, 61.45; H, 6.63; S, 7.81. Found: C, 61.45; H, 6.74; S, 7.91.

EXAMPLE 12

6α-Chloro-16α,17α-Dihydroxyprogesterone 16α,17α-Sulfite

Following the procedure of Example 11, 6α-chloro-16α,17α-dihydroxyprogesterone (prepared by treating 16α,17α-epoxy-progesterone in dioxane with ethyl orthoformate in ethanol and sulfuric acid to form 3-ethoxy-16α,17α-epoxy-$\Delta^{3,5}$-pregnadiene-20-one which is treated in solution with dioxane, with N-chlorosuccinimide and a sodium acetate-acetic acid buffer followed by dilution with water. The resulting 6β-chloro-16α,17α-epoxyprogesterone dissolved in acetic acid, is treated with 33% HBr to yield 6α-chloro-16β-bromo-$\Delta^4$-pregnene-17α-ol-3,20-dione. The latter is converted to its 17α-acetoxy derivative by treatment with acetic anhydride in 70% perchloric acid and this product is treated with sodium acetate in acetic acid to yield 6α-chloro-16α,17α-dihydroxyprogesterone 16α-acetate, which is finally treated with methanolic potassium carbonate to yield the desired 6α-chloro-16α,17α-dihydroxyprogesterone) is treated with thionyl chloride to yield the product 6α-chloro-16α,17α-dihydroxyprogesterone, 16α,17α-sulfite.

EXAMPLE 13

6α-Fluoro-16α,17α-Dihydroxy-1-Dehydroprogesterone 16α,17α-Sulfite

6α-fluoro-16α,17α - dihydroxyprogesterone 16,17-sulfite is microbiologically 1,2-dehydrogenated in accordance with the procedure of Example 1 of U.S. Patent No. 2,822,318 to yield the product 6α-fluoro-16α,17α-dihydroxy-1-dehydroprogesterone 16α,17α-sulfite.

EXAMPLE 14

6β-Fluoro-16α,17α-Dihydroxyprogesterone 16α,17α-Sulfite (A) *Preparation of 6β-fluoropregnane-5α,16α,17α-triol-3,20-dione 16α,17α-sulfite.*—To a solution of 150 mg. of 6β-fluoropregnane-5α,16α,17α-triol-3,20-dione (prepared as described in Serial No. 859,840, filed December 16, 1959) in 5 ml. of dry pyridine is added −20° 0.3 ml. of thionyl chloride. After 3 minutes at −20° ice water is added and the mixture extracted with chloroform. The chloroform extract is washed with 2 N hydrochloric acid, water, dilute sodium bicarbonate and again with water, dried over sodium sulfate and the solvent removed in vacuo. The crude residue (about 115 mg.) is dissolved in 5 ml. of chloroform and 25 ml. of benzene and chromatographed on 2.5 g. of neutral alumina. Elution with 150 ml. of a mixture of five parts of benzene and one part of chloroform furnishes about 49 mg. of crude 6β-fluoropregnane-5α,16α,17α-triol-3,20-dione 16α,17α-sulfite which after two crystallizations from acetone-hexane has the following properties: M.P. about 290–291°, no selective absorption at 235mμ;

$\lambda_{max.}^{Nujol}$ 2.97, shoulder at 5.82, 5.88, and 8.37μ

*Analysis.*—Calc'd for $C_{21}H_{29}O_6FS$ (428.44): C, 58.86; H, 6.98. Found: C, 59.27; H, 6.75.

(B) *Preparation of 6β-fluoro-16α,17α-dihydroxyprogesterone 16α,17α-sulfite.*—To a solution of 150 mg. of 6β-fluoropregnane-5α,16α,17α-triol-3,20-dione 16α,17α-sulfite in 6 ml of dry pyridine is added at 0° 0.6 ml. of thionyl chloride. The mixture is allowed to stand at 0° for 30 minutes, after which time ice is added and the mixture extracted with chloroform. The chloroform extract is washed with 2 N hydrochloric acid, water, dilute sodium bicarbonate and again with water, dried over sodium sulfate and evaporated to dryness in vacuo. The resulting residue (about 56 mg.) is dissolved in a mixture of 5 ml. of chloroform and 25 ml. of benzene and poured through a column of 1 g. of neutral alumina. The effluent (25 ml.) furnishes about 10 mg. of crystalline material which after recrystallization from acetone-hexane represents pure 6β-fluoro-16α,17α-dihydroxyprogesterone 16α,17α-sulfite having the following properties: M.P. about 235–238°; $[\alpha]_D^{23}$+105° (c., .49 in chlf.);

$\lambda_{max.}^{alc.}$ 232 mμ ($\epsilon$=13,000)

*Analysis.*—Calc'd for $C_{21}H_{27}O_5FS$ (410) C, 61.44; H, 6.63. Found: C, 60.68; H, 6.50.

EXAMPLE 15

6α-Fluoro-16α,17α-Dihydroxyprogesterone 16α,17α-Sulfate

To a solution of 95 mg. of 6α-fluoro-16α,17α-dihydroxyprogesterone in 3 ml. of pyridine is added at −15° 0.1 ml. of sulfuryl chloride. The reaction is allowed to proceed for 15 minutes at −15°, after which time ice water is added and the mixture taken up in chloroform. The resulting chloroform extract is washed with dilute sufuric acid, water, dilute sodium bicarbonate and again with water, dried over sodium sulfate and the solvents removed in vacuo. The resulting crystalline residue (about 102 mg.) after recrystallization from chloroform-ethanol furnishes about 60 mg. of pure 6α-fluoro-16α,17α-dihydroxyprogesterone-16α,17α-sulfate of the following properties: M.P. about 272° (dec.); $[\alpha]_D^{23}$+141° (c., 1.17 in chlf.);

$\lambda_{max.}^{alc.}$ 233 mμ ($\epsilon$=11,400); $\lambda_{max.}^{Nujol}$ 5.78, 5.96, 6.16, 7.20 and 8.27μ

*Analysis.*—Calc'd for $C_{21}H_{27}O_6FS$ (426.48): C, 59.15, H, 6.38; S, 7.51. Found: C, 58.94, H, 6.26; S, 7.69.

EXAMPLE 16

6β-Fluoro-16α,17α-Dihydroxyprogesterone 16α,17α-Sulfate

Following the procedure of Example 7, 6β-fluoro-16α,17α-dihydroxyprogesterone 16α,17α-sulfite is treated with calcium permanganate, the reaction mixture extracted and the extract dried and then recrystallized to yield the product 6β-fluoro-16α,17α-dihydroxyprogesterone 16α,17α-sulfate.

EXAMPLE 17

6-Dehydro-16α,17α-Dihydroxyprogesterone 16α,17α-Sulfite

A solution of 250 mg. of 16α,17α-dihydroxyprogesterone 16α,17α-sulfite and 500 mg. of recrystallized chloranil is heated under reflux in a mixture of 10 ml. of ethyl acetate and 2 ml. of glacial acetic acid for 20 hours. The mixture is cooled, poured into water and the layers separated. After additional extraction of the aqueous layer with ethyl acetate, the ethyl acetate extract is washed with 1 N sodium hydroxide solution until the aqueous layer became colorless (7 times). The ethyl acetate extract is washed with water, dried over sodium sulfate and evaporated to dryness in vacuo. The crude residue, which amounts to about 200 mg. is dissolved in benzene and chromatographed on 6 g. of neutral alumina. Elution of the column with 200 ml. of benzene containing 5% chloroform, furnishes about 130 mg. of the crystalline sulfite ester which is analytically pure after recrystallization from acetone-hexane. The purse product has the following properties: M.P. about 229–230°; $[\alpha]_D^{23}$+149° (.97 in chlf.);

$\lambda_{max.}^{alc.}$ 282 mμ ($\epsilon$=26,000); $\lambda_{max.}^{Nujol}$ 5.84, 6.05, 6.19, 6.32 and 8.30μ

*Analysis.*—Calc'd for $C_{21}H_{26}O_5S$ (390.46): C, 64.58; H, 6.71; S, 8.22. Found: C, 64.51; H, 6.64; S, 8.17.

EXAMPLE 18

$\Delta^{1,4,6}$-Pregnatriene-16α,17α-Diol-3,20-Dione 16α,17α-Sulfite

The product of Example 17 is miscrobiologically dehydrogenated with *Bacterium cyclooxydans* in accordance with the procedure of Example 1 of U.S. Patent No.

2,822,318 to yield the product Δ$^{1,4,6}$-pregnatriene-16α, 17α-diol-3,20-dione 16α,17α-sulfite.

EXAMPLE 19

16α,17α,21-Triyhdroxy-6-Dehydroprogesterone 16α,17α-Sulfite 21-Acetate

The product of Example 3, 16α,17α,21-trihydroxyprogesterone 16α,17α-sulfite 21-acetate, is treated with chloranil in ethyl acetate and acetic acid in accordance with the procedure of Example 17 thereby yielding the product 16α,17α,21 - trihydroxy - 6-dehydroprogesterone, 16α, 17α-sulfite 21-acetate.

EXAMPLE 20

6-Dehydro-16α,17α-Dihydroxyprogesterone 16α,17α-Sulfate

Treatment of the product of Example 17, in accordance with the procedure of Example 7, yields the oxidation product 6-deyhdro-16α,17α-dihydroxyprogesterone 16α,17α-sulfate.

EXAMPLE 21

Δ$^{1,4,6}$-Pregnatriene-16α,17α-Diol-3,20-Dione 16α,17α-Sulfate

The product of Example 20 is enzymatically dehydrogenated with Bacterium cyclooxydans in accordance with the procedure outlined in Example 1 of U.S. Patent No. 2,822,318 to yield the product Δ$^{1,4,6}$-pregnatriene-16α, 17α-diol-3,20-dione 16α,17α-sulfate.

EXAMPLE 22

6-Methyl-6-Dehydro-16α,17α-Dihydroxyprogesterone 16α,17α-Sulfite

A solution of 145 mg. of 6α-methyl-16α,17α-dihydroxyprogesterone 16α,17α-sulfite and 300 mg. of chloranil in a mixture of 7.5 ml. of ethyl acetate and 1.5 ml. of acetic acid is heated under reflux for 42 hours. The reaction mixture is worked up as described in Example 17. Evaporation of the ethyl acetate extract in vacuo yields a residue which is dissolved in 5 ml. of benzene and chromatographed on 4.5 g. of neutral alumina. Elution with benzene (125 ml.) furnishes about 89 mg. of crystalline material which after recrystallization from acetone-hexane has the following properties: M.P. about 221–222°; $[\alpha]_D^{23}$+166° (c., .85 in chlf.);

$\lambda_{max.}^{alc.}$ 286 mμ (ε=16,400) 241 mμ (ε=7,400); $\lambda_{max.}^{Nujol}$ 5.85 6.00, 6.14, 6.25, 6.34, and 8.38μ

Analysis.—Calc'd for $C_{22}H_{28}O_5S$ (404.44):C, 65.32; H, 6.98; S, 7.93. Found: C, 65.70; H, 7.11; S, 7.22.

EXAMPLE 23

6β-Methyl-16α,17α-Dihydroxyprogesterone 16α,17α-Sulfite

To a solution of 190 mg. of 6β-methylpregnane-5α, 16α,17α-triol-3,20-dione (prepared as described in my copending application Serial No. 764,495 of October 1, 1958) in 5 ml. of dry pyridine is added at 0° 0.5 ml. of thionyl chloride. After 7½ minutes at 0° ice water is added and the resulting crystalline precipitate filtered and washed well with water. Ice water is added and the resulting mixture extracted with chloroform. The chloroform extract is washed with dilute sulfuric acid, water, dilute sodium bicarbonate and again with water, dried over sodium sulfate and evaporated to dryness in vacuo. The resulting crystalline residue is dissolved in 5 ml. of chloroform and 30 ml. of benzene and chromatographed on 3 g. of neutral alumina. Elution of the column with mixtures of benzene and chloroform, 5:1 (50 ml.), 3:1 (50 ml.) and 2:1 (50 ml.) furnishes about 125 mg. of crude material which after two crystallizations from chloroform-methanol furnishes pure 6β-methyl-16α,17α-dihydroxyprogesterone 16α,17α-sulfite of the following properties: M.P. about 281–283°; $[\alpha]_D^{23}$+163° (c., .82 in chlf.);

$\lambda_{max.}^{alc.}$ 234 mμ (ε=12,800); $\lambda_{max.}^{Nujol}$ 5.80, 6.00, 6.22, and 8.37μ

Analysis.—Calc'd for $C_{22}H_{30}O_5S$ (406.46):C, 64.99; H, 7.44. Found: C, 64.98; H, 7.52.

EXAMPLE 24

6β-Methyl-16α,17α-Dihydroxy-1-Dehydroprogesterone 16α,17α-Sulfite

Treatment of the product of Example 23 in accordance with the microbiological dehydrogenation procedure outlined in Example 1 of U.S. Patent No. 2,822,318, furnishes the product 6β-methyl-16α,17α-dihydroxy-1-dehydroprogesterone 16α,17α-sulfite.

EXAMPLE 25

6α-Methyl-16α,17α-Dihydroxyprogesterone 16α,17α-Sulfite (A) Preparation of 6α-methyl-16α,17α-dihydroxyprogesterone.—To a solution of 3.69 g. of 6α-methyl-16-dehydroprogesterone dissolved in 30 ml. of benzene and 3.6 ml. of dry pyridine is added in the dark, dropwise, with stirring over a period of 2 hours, a solution of 3 g. of osmium tetroxide in 45 ml. of benzene. The resulting mixture is stirred in the dark for an additional 3¼ hours, after which 75 ml. of benzene, 138 ml. of methanol, 204 ml. of water, 21.3 g. of sodium sulfite, and 21.3 g. of potassium bicarbonate is added and the mixture shaken for 18 hours. 250 ml. of chloroform is then added and the resulting suspension shaken for an additional ½ hour, filtered and the precipitate washed 3 times with 100 ml. portions of hot chloroform. After separation of the layers, the organic layer is washed 3 times with water, dried over sodium sulfate and the solvents removed in vacuo. The resulting residue (about 4 g.) on crystallization from acetone affords about 3.72 g. of 6α-methyl-16α,17α-dihydroxyprogesterone, M.P. about 220–226° C. After recrystallization from acetone the pure glycol is obtained with the following properties: M.P. about 224–226° C; $[\alpha]_D$+68° (c., .99 in chlf.);

$\lambda_{max.}^{Nujol}$ 2.95, 5.90, 6.02, 625μ; $\lambda_{max.}^{alc.}$ 2.40 mμ (ε=16,500)

Analysis.—Calc'd for $C_{22}H_{32}O_4$(360): C, 73.30; H, 8.95. Found: C, 73.44; H, 8.98.

(B) Preparation of 6α-methyl-16α,17α-dihydroxyprogesterone 16α,17α-sulfite.—6α-methyl-16α,17α-dihydroxyprogesterone (100 mg.) is reacted with thionyl chloride (.4 ml.) in pyridine (3 ml.) exactly as described in Example 1. The crude sulfite ester obtained after evaporation of the chloroform extract is dissolved in 2 ml. of chloroform and 10 ml. of benzene and chromatographed on 2.5 g. of neutral alumina. Elution of the column with a mixture of two parts of chloroform and ten parts of benzene yields about 116 mg. of crude crystalline material, which after recrystallization from acetone-hexane gives pure 6α-methyl-16α,17α-dihydroxyprogesterone 16α,17α-sulfite having the following properties: M.P. about 202–204° and about 221–223° (polymorphic modifications); $[\alpha]_D^{23}$+187° (c., 1.10 in chlf.);

$\lambda_{max.}^{alc.}$ 239 mμ (ε=16,000); $\lambda_{max.}^{Nujol}$ 5.86, 6.00, 6.25 and 8.39μ

Analysis.—Calc'd for $C_{22}H_{30}O_5S$: C, 64.99; H, 7.44; S, 7.89. Found: C, 64.97; H, 7.61; S, 7.84.

EXAMPLE 26

6α-Methyl-16α,17α-Dihydroxyprogesterone 16α,17α-Sulfate

6α-methyl-16α,17α-dihydroxyprogesterone (200 mg.) is reacted with 0.2 ml of sulfuryl chloride in 5 ml. of pyridine as described in Example 15. The residue from the chloroform extract (270 mg.) is dissolved in 4 ml. of benzene and 4 ml. of hexane and chromatographed on 5 g. of neutral alumina. Elution with a mixture of one part of benzene and one part of hexane furnishes about 60 mg. of crystalline material which is first recrystallized from ether and then from acetone-hexane. From this latter solvent pure 6α-methyl-16α,17α-dihydroxyprogesterone 16α,17α-sulfate is obtained possessing the following properties: M.P. about 183–184°; $[\alpha]_D^{23}+132°$ (c., 1.13);

$\lambda_{max.}^{alc.}$ 240 mμ (ε=12,500); $\lambda_{max.}^{Nujol}$ 5.80, 5.90, 5.97, 6.21, 6.40 and 8.30mμ

*Analysis.*—Calc'd for $C_{22}H_{30}O_6S$(422.52):C, 62,53; H, 7.15. Found: C, 61.53; H, 6.81.

An alternate process for the preparation of the 16,17-sulfate esters consists of oxidation of the corresponding sulfite esters with calcium permanganate.

EXAMPLE 27

*16α,17α,21-Trihydroxyprogesterone 16α,17α-Sulfate*

The product of Example 9 is treated with an aqueous solution of potassium carbonate at room temperature. Separation of the precipitate from the reaction mixture yields the product 16α,17α,21-trihydroxyprogesterone 16α, 17α-sulfate.

This invention may be variously otherwise embodied within the scope of the appended claims.

What is claimed is:

1. A compound represented by the following general formula:

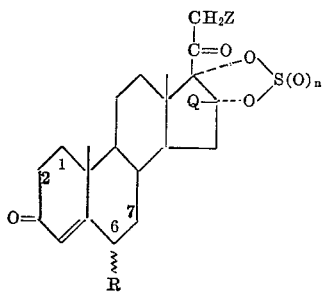

wherein the 1,2 and 6,7 positions are connected by a linkage selected from the group consisting of a single and a double bond; Q is selected from the group consisting of hydrogen and methyl; R is selected from the group consisting of hydrogen, lower alkyl, fluoro and chloro; n is an integer selected from the group consisting of one and two; and Z is a member selected from the group consisting of hydrogen, halogen, hydroxy and the acyloxy radical of a hydrocarbon carboxylic acid of less than ten carbon atoms.

2. 16α,17α-dihydroxyprogesterone 16α,17α-sulfite.

3. 16β-methyl-16α,17α-dihydroxyprogesterone 16α,17α-sulfite.

4. 16α,17α-dihydroxyprogesterone 16α,17α-sulfate.

5. 6α-fluoro-16α,17α-dihydroxyprogesterone 16α,17α-sulfite.

6. 6β-fluoro-16α,17α-dihydroxyprogesterone 16α,17α-sulfite.

7. 6-dehydro-16α,17α-dihydroxyprogesterone 16α,17α-sulfite.

8. 6-methyl-6-dehydro-16α,17α-dihydroxyprogesterone 16α,17α-sulfite.

9. 6β-methyl-16α,17α-dihydroxyprogesterone 16α,17α-sulfite.

10. 6α-methyl-16α,17α-dihydroxyprogesterone 16α,17α-sulfite.

11. A process which comprises treating a 16α,17α-dihydroxyprogesterone with a member selected from the group consisting of sulfuryl chloride and thionyl chloride in an organic nitrogen base at a temperature of about 0° C. and below, and separating the 16α,17α-cyclic ester thus formed.

12. A process for the preparation of the 16,17-cyclic esters of 16β-methyl-16α,17α-dihydroxyprogesterones which comprises treating a $\Delta^{5,16}$-16-methyl-pregnadiene-3β-ol-20-one with a lower alkylene glycol in the presence of an acid, oxidizing the thus formed $\Delta^{5,16}$-16-methylpregnadiene-3β-ol-20-one-20-lower alkylene ketal to the corresponding $\Delta^4$-3-one, treating the $\Delta^4$-3-one first with osmium tetroxide and then a reducing agent, treating the resulting 16-methyl-16α,17α-dihydroxyprogesterone 20-ketal with a member selected from the group consisting of thionyl chloride and sulfuryl chloride in an organic nitrogen base at a temperature of about 0° C. and below to form the corresponding 16α,17α-cyclic ester, and converting said cyclic ester by acid hydrolysis to a 16β-methyl-16α, 17α-dihydroxyprogesterone 16α,17α-cyclic ester.

13. $\Delta^{5,16}$-16-methylpregnadiene-3β-ol-20-one 20-ethylene ketal.

14. $\Delta^{4,16}$-16-methylpregnadiene-3,20-dione 20-ethylene-ketal.

15. 16β-methyl-16α,17α-dihydroxyprogesterone 20-ethylene-ketal.

16. 16β-methyl-16α,17α-dihydroxyprogesterone 16α, 17α-sulfite 20-ethylene-ketal.

17. A process which comprises treating a 6β-halopregnane-5α,16α,17α-triol-3,20-dione, wherein the halogen is a member selected from the group consisting of fluoro and chloro, with a member selected from the group consisting of thionyl chloride and sulfuryl chloride in an organic nitrogen base at a temperature of about 0° C. and below, and recovering the corresponding 16α, 17α-cyclic ester of 16β-halo-16α,17α-dihydroxyprogesterone thus formed.

18. A process which comprises treating a 6β-methylpregnanes-5α,16α,17α-triol-3,20-dione with a member selected from the group consisting of thionyl chloride and sulfuryl chloride in an organic nitrogen base at a temperature of about 0° C. and below, and recovering the corresponding 16α,17α-cyclic ester of 6β-methyl-16α,17α-dihydroxyprogesterone thus formed.

References Cited in the file of this patent

Cooley et al.: J. Chem. Soc. (London), 1955, pp. 4373–6.

Mills et al.: J.A.C.S., 81, 1264–5 (1959).

Allen et al.: J.A.C.S., 81, 4968–79 (1959).

Noller: Chemistry of Organic Compounds (1957), W. B. Saunders, Co., Philadelphia, Pa., page 101.

Fieser et al.: Steroids (1959), Reinhold Pub. Corp., New York, N.Y., page 786.

UNITED STATES PATENT OFFICE
CERTIFICATE OF CORRECTION

Patent No. 3,049,540                      August 14, 1962

Josef Fried

It is hereby certified that error appears in the above numbered patent requiring correction and that the said Letters Patent should read as corrected below.

Column 1, line 55, for "ester" read -- esters --; column 10, line 73, for "miscrobiologically" read -- microbiologically --; column 12, line 42, for "625μ" read -- 6.25μ --; column 14, line 43, for "16β-halo-" read -- 6β-halo- --.

Signed and sealed this 25th day of December 1962.

(SEAL)
Attest:

ERNEST W. SWIDER
Attesting Officer

DAVID L. LADD
Commissioner of Patents